United States Patent [19]

Malhotra

[11] 4,107,194

[45] Aug. 15, 1978

[54] PRODUCT AND PROCESS FOR REDUCING DISCOLORATION AND DARK SPOTTING IN TETRAFLUOROETHYLENE RESIN MOLDED PARTS

[75] Inventor: Satish Chandra Malhotra, Parkersburg, W. Va.

[73] Assignee: E. I. Du Pont de Nemours and Company, Wilmington, Del.

[21] Appl. No.: 760,395

[22] Filed: Jan. 18, 1977

Related U.S. Application Data

[63] Continuation-in-part of Ser. No. 645,220, Dec. 29, 1975, abandoned.

[51] Int. Cl.$^2$ ............................ C08K 3/08; C08K 7/14
[52] U.S. Cl. .......................... 260/42.18; 260/29.15 B; 260/42.22; 260/42.24; 260/42.26; 260/827
[58] Field of Search ..................... 260/29.15 B, 42.18, 260/42.22, 42.26, 827, 42.24

[56] References Cited

U.S. PATENT DOCUMENTS

| | | | |
|---|---|---|---|
| 2,644,802 | 7/1953 | Lontz | 260/42.46 |
| 2,927,908 | 3/1960 | Konkle | 260/42.26 |
| 3,150,207 | 9/1964 | Gore | 260/827 |
| 3,915,916 | 10/1975 | Leverett | 260/42.26 |
| 3,929,721 | 12/1975 | Leverett | 260/42.26 |

*Primary Examiner*—James H. Derrington

[57] ABSTRACT

A means for reducing discoloration and/or spotting occurring at air-starved areas of sintered moldings of filled comminuted granular tetrafluoroethylene resin is described which comprises incorporating a silicone into granular comminuted tetrafluoroethylene resin containing a filler material.

7 Claims, No Drawings

PRODUCT AND PROCESS FOR REDUCING DISCOLORATION AND DARK SPOTTING IN TETRAFLUOROETHYLENE RESIN MOLDED PARTS

CROSS-REFERENCE

This application is a continuation-in-part of application Ser. No. 645,220, filed Dec. 29, 1975, now abandoned.

FIELD OF THE INVENTION

This invention relates to granular tetrafluoroethylene resins containing a filler; and more particularly, to such filled resins in comminuted form which contain a silicone.

BACKGROUND OF THE INVENTION

Tetrafluoroethylene polymers in molded form are useful where low coefficients of friction and good high temperature stability are desirable, such as, for example, bearings. These molding powders sometimes contain a filler such as glass fibers, bronze particles or powder, and the like, to improve their mechanical properties such as wear resistance.

These molding powders are ordinarily fabricated by preforming in a mold under pressure at room temperature, followed by sintering the preform at a temperature above the melting point of the polymer, e.g., at about 370°–400° C. The sintering can be carried out either while the preform is in the mold, or after the preform has been removed from the mold.

In the case of bronze-filled molding powder, there is a problem with discoloration of the molding to an unattractive purple-black color in those parts of the molding which are sintered under air-starved conditions. Even when sintering is carried out in air, there can be air-starved regions at the center of large moldings where air does not penetrate. When the molding is cut in machining a part there is a very unattractive difference in color in different regions of the part. It is believed that the discoloration is caused by degradation of the tetrafluoroethylene polymer at high temperature to give small amounts of carbon, the degradation being catalyzed by the bronze.

In the case of glass-filled molding powder, there is a problem also. When the filler is glass in any of its forms such as fiber, beads, etc., in regions air-starved during sintering, there is a general gray discoloration and localized black or dark gray spots. It is believed that the color and the specks are caused by iron in the glass. It is believed that this impurity promotes the decomposition of some of the polymer to elemental carbon and that the dark spots or specks are deposits of elemental carbon.

In any event, if the preform is removed from the mold prior to sintering, so that its surface is exposed to the atmosphere during sintering, no discoloration or dark specks appear on the surface. However, if the preform is thick enough that the air cannot penetrate into the interior of the preform then during sintering the air-starved interior will become gray and contain dark specks and upon subsequent cutting, the exposed interior reveals the unsightly specks.

Similarly, if the preform is not removed from the mold prior to sintering, but rather remains in the mold during sintering, then air cannot reach the surface of the preform and upon removal of the sintered preform from the mold, the discoloration and specks are present on the surface of the molded articles as well as in the interior.

Removal of impurities from glass fiber fillers can be accomplished by cleaning the glass before preparing the filled tetrafluoroethylene resin. However, this introduces a separate step into the process, and furthermore, only removes the impurities from one of several possible sources of contamination. A means for preventing the dark spots and discoloration without any additional process steps is desirable.

SUMMARY OF THE INVENTION

It has now been found that by incorporating a silicone into filled comminuted granular tetrafluoroethylene resin having an average particle size of less than $200\mu$, the resulting molding powder composition can be sintered without substantial discoloration and/or spotting of air-starved portions thereof.

DESCRIPTION OF THE INVENTION

The tetrafluoroethylene polymers used herein are unsintered, are non-melt-fabricable, and are of the granular type made by suspension polymerization (as distinguished from the "fine powder" type made by aqueous dispersion polymerization followed by coagulation).

By tetrafluoroethylene polymer is meant the homopolymer of tetrafluoroethylene (PTFE) and copolymers thereof wherein the amount of comonomer present in polymerized form is small enough to maintain the non-melt-fabricable nature of the copolymer. Generally, this small amount will be less than 2% by weight based on the weight of the copolymer. The comonomer is

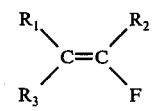

wherein
$R_1$ separately is F or H
$R_2$ separately is F or Cl
$R_3$ separately is Cl, $-R_F$, $-OR_F$, $-R'_FH$, $-OR'_FH$, $-R_FCl$ or $-OR'_FCl$,
wherein $R_F$ is linear perfluoroalkyl of 1–5 carbon atoms, and $R'_F$ is linear perfluoroalkylene (perfluorinated alkane diradical) of 1–5 carbon atoms in which the designated substituent is an omega substituent; and when $R_2$ is F, $R_1$ and $R_3$ taken together can be

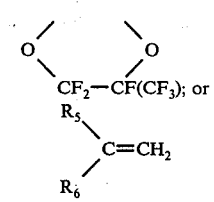

wherein $R_5$ and $R_6$ are $-CF_3$ or $-CClF_2$.

The comonomer is preferably perfluoroalkene of 3–6 carbon atoms, e.g., hexafluoropropylene, or a perfluoro(alkyl vinyl ether) of 3–6 carbon atoms, e.g., perfluoro(propyl vinyl ether). These polymers are not melt-fabricable, i.e., they have a specific melt viscosity of at least $1 \times 10^9$ poises at 380° C.

To obtain specific melt viscosity, the rate of elongation is measured for a small strip of resin in creep under a known tensile stress. 12 g. of tetrafluoroethylene resin is placed in 7.6 cm. diameter mold between 0.152 cm. rubber cauls and paper spacers. The mold is then heated at 100° C. for 1 hour. Pressure is then slowly applied on the mold until a value of 140.6 kg./cm.² is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire.

The distance between wrappings is 4.0 cm. This quartz rod-sample assembly is placed in a columnar oven where the 4 cm. test length is brought to a temperature of 380 ± 2° C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity is then calculated from the relationship $$n = (WL_T g)/[3(dL_T/dt)A_T]$$

where
$n$ = specific melt viscosity in shear, poises
$W$ = tensile load on sample, g
$L_T$ = length of sample (at 380° C.) cms. (The length increases about 8% at 380° C. over that at room temperature.)
$g$ = gravitational constant, 980 cm./sec.
$(dL_T/dt)$ = rate of elongation of sample under load or the slope of elongation vs. time plot, cm./sec.
$A_T$ = cross-sectional area of sample (at 380° C.), cm.² — (area increases about 37% at 380° C. over that at room temperature).

Tetrafluoroethylene polymer granules, as obtained from suspension polymerization, have an average diameter of about 1000 microns. For use as molding powders, the granules are comminuted, i.e., subdivided into finely divided particles having a $d_{50}$ of below about 200 microns and usually to a $d_{50}$ about 20-50 microns. The $d_{50}$ will depend on the degree of grinding. Generally, the $d_{50}$ should be at least about 5 microns.

The particulate filler used herein includes metallic or glass fillers such as glass fibers, glass beads, powdered bronze, asbestos, mica, and the like, to which may be added other additives such as pigments. The filler may be present in an amount of from 5 to 40%, preferably 15-25%, by volume based on the volume of the tetrafluoroethylene polymer and the filler. The filler, when in particle form, i.e., bead or powder, should preferably have an average size no greater than about the size of the polytetrafluoroethylene and preferably smaller so that in the resultant blend, the filler particles are largely enveloped by the polymer. When in fiber or flake form, the length of the fiber or the largest length of the flake, as the case may be, should be no more than 6.5 mm. and preferably no more than 0.8 mm.

The silicone employed herein is a silicone fluid (oil), gum or resin which can be linear or cross-linked. Ordinarily, commercial silicones are mixtures of silicone polymers. Generally the structure of the recurring units of the linear silicones is

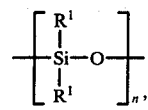 (1)

while the structure of the recurring units of the cross-linked silicones is

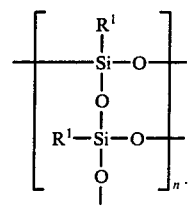 (2)

Resins, of course, are cross-linked whereas fluids are linear. The number of such recurring units in any one polymer is ordinarily between 10 and 5000, preferably 10 and 2000 and most preferably 10 and 200.

The recurring silicone units in the polymer are ordinarily end-capped with

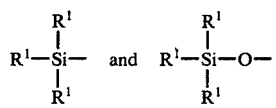

units, depending, of course, upon whether the end-cap is at the —Si— or the —O— of the recurring unit.

$R^1$ in the formulas above can be the same or different within any one recurring unit and is a hydrocarbyl radical of 1 to 20 (preferably 1 to 10) carbon atoms, e.g., alkyl, aryl, alkaryl and aralkyl and can be hydrogen provided no more than one hydrogen is attached to any one Si atom. The silicone can also be modified with up to 4% (0–4%) hydroxy function. Preferably the $R^1$ groups are methyl and phenyl.

The silicone is present in the filled tetrafluoroethylene resin in an amount of between about 0.001% to 0.5% of the weight of the mixture, preferably 0.001% to 0.10%. Examples of silicones include phenyl methyl siloxane, dimethyl siloxane optionally containing 0.5% hydroxy function, monophenyl siloxane optionally containing 1.5% hydroxy function, monophenyl siloxane optionally containing 4.0% hydroxy function, and propyl modified monophenyl siloxane.

In addition, the silicone can contain a filler as a thickener, such as silica.

Preferably the silicone is a silicone fluid, i.e., one where the recurring units are linear and the number of such units in the polymer is between 10 and 200.

The order in which the ingredients of the mixture of this invention are mixed together is not important. The ingredients can be blended together simultaneously, or the silicone can be preblended with the tetrafluoroethylene resin or the filler before incorporating the other, or the tetrafluoroethylene resin can be preblended with the filler before adding the silicone.

The ingredients are blended simply by mixing them together in any dry blending apparatus. For example, the Lodige blender, Waring blender, Henschel mixer, and Rietz mill are but a few types of apparatus that can be used to dry blend the ingredients. If the silicone is added in solution form, the solvent should be evaporated if it has not done so during mixing. Temperature and pressure are not critical and ordinarily 15–35° C. and atmospheric pressure are used. Time is not critical, but usually the ingredients are mixed until intimate blending is achieved.

The silicone can be blended in dry solid form, flake or powder, or in solution form in a suitable solvent, such as a liquid hydrocarbon, e.g., xylene, or a liquid chlorinated hydrocarbon, such as tetrachloroethylene. Preferably, silicone is predissolved in solvent, preferably 7–15% in tetrachlorethylene and is then blended with comminuted granular tetrafluoroethylene resin, at 15 to 20° C., followed by removal of any remaining solvent (usually by subjecting the blend to an air stream at 30°–35° C.). Finally, the filler is blended at 15° to 35° C. to obtain the mixture of this invention.

If desired, additives such as pigments can be present in usual amounts. Pigments ordinarily added to tetrafluoroethylene resins include titanium dioxide, cadmium sulfide/cadmium selenide, antimony/nickel/$TiO_2$, etc.

In the examples of the invention which follow, the physical data provided was determined as follows:

The "standard specific gravity" (SSG) of the polytetrafluoroethylene as referred to hereinafter is determined by a modified procedure based upon ASTM D-1457-69. The modifications of ASTM D-1457 procedure were made to correct its deficiencies. The procedure employed comprises the use of a 12-gram sample of polytetrafluoroethylene powder preformed at 562 kg/cm$^2$ in a mold 2.86 cm. in diameter. The preform is placed in an oven preheated to 300° C. The temperature of the oven is then raised to 380° C. at the rate of 2° C. per min. The temperature of the oven is maintained at 380° C. for 30 min. and the oven is then cooled to 295° C. at 1° C/min., and hold at this temperature for 25 min., after which the test specimen is removed, allowed to cool to room temperature and the SSG determined as described in ASTM 792-66.

The "apparent density" (AD), as used herein, is obtained by a procedure described in ASTM D-1457-69 without separating and reconstituting the sample.

"Tensile strength" (TS) and "ultimate elongation" (E) are determined in accordance with ASTM D-1457-69, but using the modified thermal cycle as described above under standard specific gravity.

"$d_{50}$" is determined by the wet sieving procedure of ASTM D-1457-69.

"% mold shrinkage" (MS) is determined by measuring the diameter of the sintered chip used to determine SSG, using the equation $$MS = \frac{(\text{mold diameter} - \text{sintered chip diameter})}{\text{mold diameter}} \times 100$$

EXAMPLE 1

13.6 Kilograms of granular polytetrafluoroethylene comminuted to a $d_{50}$ of about 30$\mu$ are charged into a Lodige blender equipped with a cooling water jacket and air jets at the seals inside the blender.

Eighteen Grams of Dow Corning Z-6018 silicone resin dissolved in 30 ml. tetrachloroethylene was evenly placed on the polytetrafluoroethylene (Z-6018 silicone resin is a propyl modified monophenyl siloxane of about 1600 mol weight with a degree of substitution of 1.0). The blender was operated at 15°–20° C. for 45 min., then the temperature was raised to 30°–35° C. for 45 min. to remove tetrachloroethylene still present while air was passed through the air jets. Then 4.54 kg. of milled fiberglass 0.8 mm in length (OCF 709-A) was added and blending was continued at 15°–20° C. for another 30 minutes.

The blend so obtained was made into a preform 2.87 cm in diameter and 0.86 cm thick, and sintered at 380° C. for 1 hour under nitrogen (the latter simulates the air-starved conditions in a mold or in the center of a large billet). The surface and cross section of the sintered molding were white and substantially spot free. Physical properties of the blend are provided in Table 1.

COMPARISON 1

The procedure of Example 1 was followed, except that no silicone resin solution was added. The surface and cross section of the sintered molding were gray and contained dark spots. Physical properties are provided in Table 1.

EXAMPLE 2

Example 1 was repeated, using 9 g. (dry basis) Dow Corning 805 silicone (50% solution in xylene) dissolved in 60 ml. Perchloroethylene and 50 ml. o-xylene. The 805 silicone resin is a phenyl methyl siloxane with a degree of substitution of 1.6. The nitrogen sintered molding was white and contained only a very few spots. Physical properties of the blend are provided in Table 1.

EXAMPLE 3

Example 1 was repeated using 9 g. Z-6018 silicone dissolved in 30 ml. perchloroethylene. The nitrogen sintered molding was white and contained only a few spots. Physical properties of the blend are provided in Table 1.

EFFECT OF CONTINUED SINTERING OF COMPARISON 1 AND EXAMPLES 2 and 3

The effect of prolonged sintering of the compositions of Comparison 1 and Examples 2 and 3 was determined by sintering moldings under nitrogen at 380° C. for 14 hours. The molding of Comparison 1 was grayer and spottier than before. The moldings of Examples 2 and 3 were only slightly darker, but not spottier, than before.

EXAMPLE 4

Example 1 was repeated with 36 g. of the Z-6018 silicone resin dissolved in 50 ml. perchloroethylene, blending only at 30°–35° C. for 45 minutes prior to glass addition and at 15°–20° C. for 45 minutes after. The nitrogen sintered molding was white and spot free. There were some white needle-like specks in the sintered molding, caused by the large amount of silicone used.

EXAMPLE 5

27.2 kilograms of the fiberglass and 54 g. of the Z-6018 silicone resins dissolved in 180 ml. perchloroethylene were charged into the blender and blended at 15°–20° C. for 45 minutes, then at 30–35° C. for 75 minutes. 22.7 kilograms of the treated glass were taken out of the blender. 13.6 kilograms of granular polytetrafluoroethylene were added to the remaining 4.54 kg. of glass and the mixture blended at 15°–20° C. for 30 minutes. The nitrogen sintered molding made from the dry blend was spot-free but slightly dark, probably because of the abrasive characteristic of the glass.

EXAMPLE 6

Thirty grams of granular polytetrafluoroethylene resin and 0.08 g. Z-6018 silicone resin powder were blended in a laboratory Waring blender for 1 minute. Ten grams of the glass fiber were added and the mixture blended for 1 minute. The nitrogen sintered molding of the blend was white and contained a very few spots.

EXAMPLE 7

Example 4 was repeated, except that the blend was reblended with small amounts of Harshaw 1405 orange cadmium sulfide/selenide and Sun Yellow C (antimony/nickel/-TiO$_2$) pigments at 15°–20° C. for 45 minutes. The nitrogen-sintered molding was yellow-gold in color as desired and there was no evidence of discoloration. In a comparative test without silicone resin, a greenish discoloration was evident after sintering.

COMPARISON 2

In a Lodige Blender a mixture of 60 parts by weight U.S. Bronze 405 bronze powder and 40 parts comminuted granular polytetrafluoroethylene was prepared. A preform 0.86 cm. thick was made and sintered under nitrogen for 1 hour at 380° C. A purple discoloration was evident in the sintered product.

EXAMPLE 8

Comparison 2 was repeated, except 100 g. of the blend was treated with 0.07 g. Z-6018 silicone in 0.44 ml. tetrachloroethylene in a Waring blender for 1 minute. This blend was vacuum dried before preforming. After preforming and sintering in nitrogen, the molding was of the original bronze color. Similar results were obtained when a different bronze powder, Alcan 101, was used.

COMPARISON 3

Comparison 2 was repeated, except that the composition also contained small amounts of Ferro V-8810 orange (cadmium sulfide/cadmium selenide) and TiO$_2$ pigments and starch to help mask the discoloration and to impart a cosmetic effect to the sintered product. However, a purple discoloration was still evident in the nitrogen sintered molding.

EXAMPLE 9

Comparison 3 was repeated, except that 100 g. of the pigmented blend was treated with 0.07 g. Z-6018 in a 0.44 ml. tetrachloroethylene in a Waring blender for 1 minute. After drying in a vacuum oven, preforming, and nitrogen sintering, the molding showed the desired cosmetic effect without discoloration. Similar results were obtained when a different bronze powder, Alcan 101, was used.

EXAMPLE 10

Forty gram samples of a blended mixture of 20% by weight fiberglass (0.8 mm length) and 80% by weight granular polytetrafluoroethylene resin comminuted to a $d_{50}$ of about 30 micron were reblended in a Waring blender at 25° to 30° C. for about 1 minute with 0.028 g. of one of the following silicones:

(a) Z-6018 silicone resin powder
(b) Silicone high vacuum grease (dimethyl polysiloxane thickened with finely divided silica)
(c) Dow Corning 710 silicone oil (a phenyl methyl polysiloxane)

Each silicone was dissolved (or in the case of the grease, dispersed) in 1 ml perchloroethylene.

The resultant blend was freed from solvent at reduced pressure at 130°–140° C.

A preform of this blend was made as described in Example 1. The surfaces of the nitrogen sintered moldings prepared with each of (a), (b), and (c) were white and contained, respectively, for each silicone composition, the following:

For composition containing (a) — a very few faint spots
For composition containing (b) — a few faint spots
For composition containing (c) — a very few faint spots

TABLE 1

| PHYSICAL PROPERTIES OF LOW FLOW, 25% GLASS FILLED, PTFE COMPOSITIONS | | | | |
|---|---|---|---|---|
| Property* | Comparison 1 | Example 1 | Example 2 | Example 3 |
| % Silicone | None | 0.10 | 0.05 | 0.05 |
| Standard Specific Gravity | 2.2524** | 2.2597 | 2.2465 | 2.2615*** |
| Mold Shrinkage, % | 2.49 | 2.40 | 2.58 | 2.40 |
| Tensile Strength, kg/cm$^2$ | 223 | 223 | 215 | 222 |
| Ultimate Elongation, % | 271 | 271 | 263 | 274 |
| Apparent Density, g/l | 457 | 483 | 485 | 479 |

*Preformed at 562 kg/cm$^2$, sintered in air, according to SSG sintering cycle.
**At 351.5 kg/cm$^2$ preform pressure:
  SG = 2.2489
  MS = 2.80
  TS = 226
  EL = 282
***At 351.5 kg/cm$^2$ preform pressure:
  SG = 2.2506
  MS = 2.67
  TS = 203
  EL = 261

The embodiments of the invention in which an exclusive property or privilege is claimed are defined as follows:

1. A mixture consisting essentially of comminuted granular tetrafluoroethylene resin that has been ground until it has a $d_{50}$ of less than 200μ, particulate filler material, and an amount of a silicone effective to reduce discoloration and dark spotting upon sintering in an air-starved environment, said mixture being mixed in an apparatus for dry blending at a temperature between about 15° and 35° C.

2. The composition of claim 1 wherein the silicone is a fluid, gum or resin.

3. The composition of claim 1 wherein the silicone is a linear silicone containing the recurring structural unit:

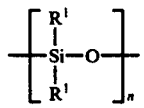

wherein each $R^1$ is independently a hydrocarbyl radical of 1 to 20 carbon atoms and one $R^1$ may be hydrogen, and $n$ is an integer between about 10 and 200.

4. The composition of claim 3 wherein the particulate filler material is glass.

5. The composition of claim 3 wherein the particulate filler material is bronze powder.

6. The composition of claim 3 which also contains a pigment.

7. The composition of claim 1 wherein the silicone is a cross-linked silicone.

* * * * *